United States Patent [19]
Guiher

[11] Patent Number: 5,435,427
[45] Date of Patent: Jul. 25, 1995

[54] ROLLER TRACK HAVING INTERNALLY WELDED SPINDLES FOR STORAGE RACK, ROLLER CONVEYOR, OR SIMILAR APPARATUS

[75] Inventor: William T. Guiher, Greenbrier, Tenn.

[73] Assignee: Unarco Material Handling, Inc., Springfield, Tenn.

[21] Appl. No.: 175,131

[22] Filed: Dec. 29, 1993

[51] Int. Cl.⁶ .............................................. B65G 13/00
[52] U.S. Cl. ................................................ 193/35 R
[58] Field of Search ................ 193/35 R, 37; 211/151

[56] References Cited

U.S. PATENT DOCUMENTS

| | | | |
|---|---|---|---|
| 842,156 | 1/1907 | Matthews et al. | 193/35 R |
| 2,740,513 | 4/1956 | Sullivan | 193/35 R |
| 2,964,155 | 12/1960 | Flowers et al. | 193/35 |
| 2,983,352 | 5/1961 | DeFlora et al. | 193/35 |
| 3,209,879 | 10/1965 | Wahl | 193/35 |
| 3,252,556 | 1/1966 | Isacsson | 193/37 |
| 3,420,348 | 1/1969 | Caudell et al. | 193/35 R |
| 3,465,864 | 9/1969 | Lodige | 193/35 R |
| 3,586,142 | 6/1971 | Inwood et al. | 193/35 |
| 3,721,326 | 3/1973 | Bussienne | 193/35 R |
| 3,869,031 | 3/1975 | Coleman et al. | 193/35 R |
| 3,900,112 | 8/1975 | Azzi et al. | 211/148 |
| 3,915,275 | 10/1975 | Specht | 193/35 R |
| 4,050,561 | 9/1977 | Seitz | 193/35 R |
| 4,054,195 | 10/1977 | Wahl | 193/35 R |
| 4,681,203 | 7/1987 | Kornylak | 193/35 R |
| 4,765,493 | 8/1988 | Kinney | 193/35 R |
| 5,056,642 | 10/1991 | Highsmith | 193/35 R |

FOREIGN PATENT DOCUMENTS

| | | | |
|---|---|---|---|
| 566468 | 4/1958 | Belgium | 193/35 R |
| 1222430 | 8/1966 | Germany | 193/35 R |

Primary Examiner—Joseph E. Valenza
Attorney, Agent, or Firm—Dressler, Goldsmith, Shore & Milnamow, Ltd.

[57] ABSTRACT

A roller track for a storage rack arranged for gravitational flow of load-bearing pallets comprises two steel walls disposed in parallel relation to each other and a plurality of freely rotatable rollers journalled between the walls, each on a steel spindle supported by the walls, in such manner that the rollers extend upwardly from a space between the walls. The ends of at least some of said spindles are welded to the walls by welds disposed substantially between the spindle ends and the planes defined by the outer surfaces of the walls, preferably between the spindle ends and the walls. In embodiments wherein the welds are disposed substantially between the spindle ends and the walls, either the ends of the welded spindles are frusto-conical or the walls are dimpled inwardly at the ends of the welded spindles, so as to facilitate spot welding. In another embodiment, the welds comprise filler metal contained substantially within apertures in the walls.

5 Claims, 1 Drawing Sheet

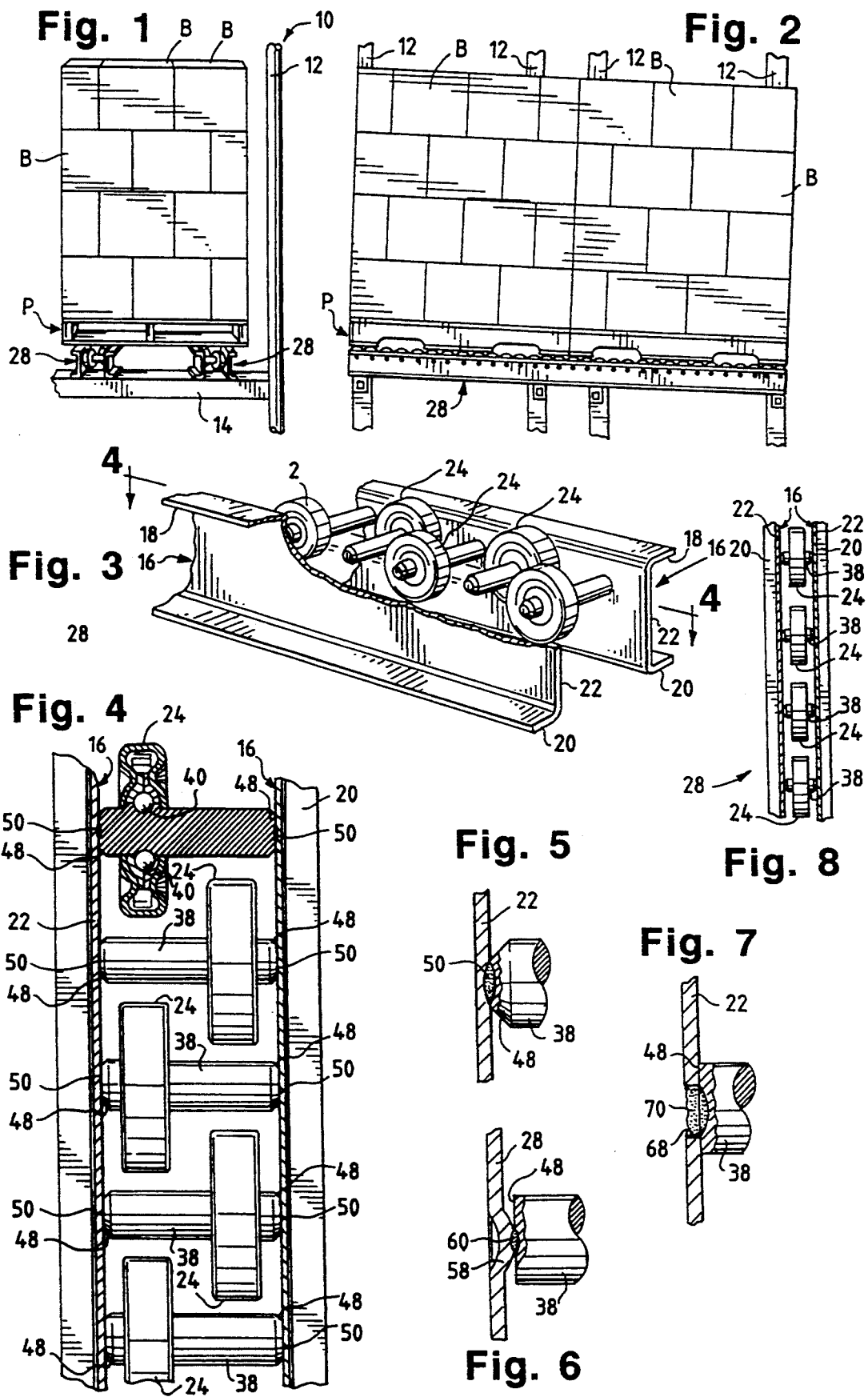

ROLLER TRACK HAVING INTERNALLY WELDED SPINDLES FOR STORAGE RACK, ROLLER CONVEYOR, OR SIMILAR APPARATUS

TECHNICAL FIELD OF THE INVENTION

This invention pertains to improvements in a roller track for a storage rack, roller conveyor, or similar apparatus.

BACKGROUND OF THE INVENTION

Typically, as used in a storage rack of a type arranged for gravitational flow of load-bearing pallets, a roller track comprises two walls, which are disposed in parallel relation to each other, and a plurality of freely rotatable rollers, which are journalled between the walls in such manner that the rollers extend upwardly from a space between the walls. Moreover, as used in such a storage rack, the roller track has a slight inclination (e.g. 3°) relative to a horizontal plane. Such storage racks are available commercially from Unarco Material Handling (a unit of UNR Industries, Inc.) of Chicago, Ill.

Such a roller track is disclosed in Highsmith U.S. Pat. No. 5,056,642. As disclosed therein, rollers of a first group are journalled on spindles bolted to the walls, and rollers of a second group are journalled on spindles held by but not bolted to the walls. Each of the bolted spindles has a tubular configuration fitting between the walls and accommodating a separate bolt. Each of the other spindles has a different configuration including, at each end, a shoulder portion larger than an aperture in one of the walls and a pintle portion fitted into the aperture.

Although the roller track disclosed in the Highsmith patent noted above permits simplified assembly, particularly as compared to prior roller tracks in which every spindle was bolted to the walls, spindles of two different configurations are employed in the roller track disclosed therein.

SUMMARY OF THE INVENTION

This invention provides, for a storage rack or roller conveyor, a roller track comprising two walls disposed in parallel relation to each other so as to define a space between the walls and a plurality of freely rotatable rollers journalled between the walls in such manner that the rollers extend upwardly from the space between the walls. The walls have inner surfaces facing the space therebetween and outer surfaces. Each of the inner and outer surfaces defines a plane. Each roller is journalled on a spindle. The walls and the spindles are made of weldable metal, such as steel.

In accordance with this invention, the spindles include spindles welded to the walls, at the ends of the welded spindles, by welds disposed substantially between the ends of the welded spindles and the planes defined by the outer surfaces of the walls. In a preferred arrangement, the welds are disposed substantially between the ends of the welded spindles and the inner surfaces of the walls. Accordingly, the ends of the welded spindles may be frusto-conical. Alternatively, the walls may have inwardly dimpled portions at the ends of the welded spindles.

In an alternative arrangement, the welds are formed substantially within apertures in the walls. Preferably, therefore, the welds are comprised of deposits of filler metal contained substantially therewithin.

BRIEF DESCRIPTION OF THE DRAWINGS

FIG. 1 is a front view of one lane on one level of a storage rack arranged for gravitational flow of load-bearing pallets. Two roller tracks, which embody this invention, are shown with such a pallet on the roller tracks.

FIG. 2 is a side view of subject matter shown in FIG. 1. Two such pallets are shown in the lane.

FIG. 3 is an enlarged, fragmentary, perspective view of two walls and several rollers in a staggered arrangement contemplated by this invention, before assembly of one roller track has been completed.

FIG. 4 is a sectional view taken along line 4—4 of FIG. 3, in a direction indicated by arrows, after assembly of the roller track has been completed.

FIGS. 5, 6, and 7 are fragmentary details showing alternative means for securing the spindles of selected rollers to the walls during assembly of the roller track.

FIG. 8, on a smaller scale compared to FIGS. 3 through 7, is a sectional view analogous to FIG. 4 but showing two walls and four rollers in an aligned arrangement contemplated by this invention.

DETAILED DESCRIPTION OF ILLUSTRATED EMBODIMENTS

As shown in FIGS. 1 and 2, a storage rack 10 constituting a preferred embodiment of this invention is arranged for gravitational flow of pallets P bearing loads of stacked boxed B. The storage rack 10 is similar to storage racks known heretofore in being a bolted or welded structure comprising structural steel members. A bolted structure is preferred. These members include upright members 12, transverse members 14, and longitudinal members 16. Each longitudinal member 16 has a slight inclination (e.g. 3°) relative to a horizontal plane.

Each longitudinal member 16 has an upper flange 18 extending in a lateral direction, a lower flange 20 extending in the same direction, and a vertical wall 22 extending between the flanges 18, 20. The longitudinal members 16 are arranged in pairs, in which the flanges 18, 20, of the respective members 16 extend oppositely, and in which the walls 22 of the respective members 16 are disposed in parallel relation to each other.

The longitudinal members 16 of each pair are assembled with a longitudinal array of steel rollers 24 in two staggered rows, as shown in FIGS. 1, 3, and 4, or in one aligned row, as shown in FIG. 8, to provide a roller track 28. In the roller track 28, the rollers 24 are journalled between the walls 22 so as to be freely rotatable. Moreover, the rollers 24 are journalled in such manner that the rollers 24 extend upwardly from a space between the walls 22. Because of the slight inclination of each longitudinal member 16, the roller track 28 has a similar inclination (e.g. 3°) relative to a horizontal plane.

The roller tracks 28 are arranged in pairs. Each pair of the roller tracks 28 is used to support pallets, such as the pallets P, in one lane on one level of the storage rack 10. According to conventional practice, the storage rack 10 may have multiple lanes on multiple levels.

At its lower end, each roller track 28 comprises a stop (not shown) which is mounted between the longitudinal members 16. The stop limits gravitational flow of the pallets, such as the pallets P, along such roller track 28. A preferred stop is disclosed in Klein U.S. Pat. No. 5,033,600.

Each roller 24 has a spindle 38 and ball bearings 40 enabling such roller 24 to rotate freely on the spindle 38.

Such bearings 40 are mounted operatively in a known manner. The spindle 38 of each roller 24 has rotational symmetry about an axis of the spindle 38 and is welded at each end face 48 to one of the walls 22.

In the staggered arrangement of FIGS. 1, 3, and 4, the rollers 24 are arranged in two staggered rows, in which the rollers 24 are disposed asymmetrically between the opposite end faces 48 of the spindles 38. In the staggered rows, the rollers 24 are alternated so that every other roller 24 is nearer to one wall 22 and so that the other rollers 24 are nearer to the other wall 22. In the aligned arrangement of FIG. 8, in which the rollers 24 are aligned in one row, the rollers 24 are disposed symmetrically between the opposite ends 48 of the spindles 38.

In the aligned arrangement, as compared to the staggered arrangement, the rollers 24 must be longitudinally spaced from one another. In the staggered arrangement, as compared to the aligned arrangement, a unit length of the roller track 28 can include more rollers 24 so as to provide more areas of contact with a supported pallet.

In each such arrangement, each of the inner and outer surfaces of the walls 22 defines a plane. Furthermore, the spindles 38 are welded to the walls 22, at the ends 48 of the welded spindles 38, by welds disposed substantially between the ends 48 thereof and the planes defined by the outer surfaces of the walls 22. Preferably, the welds are disposed between the end faces 48 of the welded spindles 38 and the walls 22.

As shown in FIG. 5, and also in FIGS. 4 and 8, each end of each spindle 38 is frusto-conical. Each frusto-conical end is welded to the nearer wall 22 by a spot weld 50 disposed substantially between such frusto-conical end and the nearer wall 22. Preferably, the spot weld 50 is formed by electrical resistance welding.

As shown in FIG. 6, each wall 22 has an inwardly dimpled portion 58 adjacent to one end 48 of each spindle 38. Each end faces 48 of each spindle 38 is welded to the inwardly dimpled portion 58 of the nearer wall 22 by a spot weld 60 disposed between such end face 48 and such inwardly dimpled portion 58. Preferably, the spot weld 60 is formed by electrical resistance welding.

As shown in FIG. 7, each wall 22 has an aperture 68 adjacent to one end face 48 of each spindle 38. Each end face 48 of each spindle 38 covers the inner margin of the adjacent aperture 68. Each end face 48 of each spindle 38 is welded to the nearer wall 22 by a weld comprised of a deposit 70 of filler metal contained substantially within the adjacent aperture 68.

Although every spindle 38 is welded at its end faces 48 to the walls 22 in each of the foregoing embodiments, this invention also contemplates embodiments (not shown) in which some spindles are welded similarly but other spindles are bolted, as disclosed in Highsmith U.S. Pat. No. 5,056,642, and embodiments (not shown) in which some spindles are welded similarly but other spindles have fixed rollers but are mounted rotatably to the walls.

Various modifications may be made in the illustrated and described embodiments without departing from the scope and spirit of this invention.

I claim:

1. For a storage rack or roller conveyor, a roller track comprising two walls made of weldable metal and disposed in parallel relation to each other so as to define a space between the walls and a plurality of freely rotatable rollers journalled between the walls in such manner that the rollers extend upwardly from the space between the walls, the walls having inner surfaces facing the space therebetween and outer surfaces, each roller having a spindle made of weldable metal with two end faces adjacent to the respective walls and being journalled on the spindle, the spindle being supported by the walls and including spindles welded to the walls by a weld disposed essentially entirely between at least one of the end faces of each welded spindle and the respective laterally adjacent wall, wherein the welds are disposed essentially entirely between both of the end faces of the welded spindles and the respective laterally adjacent walls.

2. The roller track of claim 1 wherein the ends of the welded spindles are frusto-conical.

3. The roller track of claim 1 wherein the walls are dimpled inwardly at the ends of the welded spindles.

4. The roller track of claim 1 wherein the rollers are arranged in two staggered rows, 5. The roller track of claim 1 wherein the rollers are arranged in one aligned row.

* * * * *